US006985812B2

(12) United States Patent
Sweetapple

(10) Patent No.: US 6,985,812 B2
(45) Date of Patent: Jan. 10, 2006

(54) SYSTEM AND METHOD FOR DETECTING INTERFERENCE IN GLOBAL POSITIONING SATELLITE SIGNALS

(75) Inventor: Lee A. Sweetapple, Springfield, VA (US)

(73) Assignee: General Dynamics Advanced Information Systems, Inc., Arlington, VA (US)

( * ) Notice: Subject to any disclaimer, the term of this patent is extended or adjusted under 35 U.S.C. 154(b) by 473 days.

(21) Appl. No.: 09/833,802

(22) Filed: Apr. 13, 2001

(65) Prior Publication Data

US 2002/0186150 A1 Dec. 12, 2002

(51) Int. Cl.
*G01S 5/02* (2006.01)

(52) U.S. Cl. .................. 701/214; 701/213; 342/357.02; 342/358

(58) Field of Classification Search ................. 701/213, 701/214, 215, 216; 342/357.6, 358
See application file for complete search history.

(56) References Cited

U.S. PATENT DOCUMENTS

| 5,420,592 | A | | 5/1995 | Johnson |
| 5,467,282 | A | | 11/1995 | Dennis |
| 5,751,244 | A | * | 5/1998 | Huston et al. ......... 342/357.03 |
| 5,786,773 | A | | 7/1998 | Murphy |
| 5,884,220 | A | * | 3/1999 | Farmer et al. ............... 701/215 |
| 6,018,313 | A | * | 1/2000 | Engelmayer et al. ... 342/357.02 |
| 6,111,541 | A | | 8/2000 | Karmel |
| 6,278,402 | B1 | * | 8/2001 | Pippin .................... 342/357.08 |
| 6,430,504 | B1 | | 8/2002 | Gilbert et al. |
| 6,456,938 | B1 | * | 9/2002 | Barnard ...................... 701/213 |
| 6,466,846 | B2 | * | 10/2002 | Maynard ...................... 701/13 |
| 6,484,097 | B2 | * | 11/2002 | Fuchs et al. ................. 701/213 |
| 6,487,499 | B1 | * | 11/2002 | Fuchs et al. ................. 701/213 |
| 6,760,663 | B2 | | 7/2004 | Brenner |
| 6,771,214 | B2 | | 8/2004 | Kober et al. |
| 2003/0114983 | A1 | * | 6/2003 | Irvin et al. .................. 701/214 |

FOREIGN PATENT DOCUMENTS

WO     WO89/05460    *   6/1989

* cited by examiner

*Primary Examiner*—Gary Chin
(74) *Attorney, Agent, or Firm*—Steptoe & Johnson LLP

(57) ABSTRACT

A system and method are provided for detecting local interference in GPS signals. A GPS receiver is capable of determining its GPS coordinates. A memory is capable of storing an initial location of the GPS receiver and a user-defined range of error. A processor is programmed to determine whether GPS coordinates from the GPS receiver differ from the initial location by more than a range of error, and for issuing a warning in response thereto.

16 Claims, 2 Drawing Sheets

SYSTEM AND METHOD FOR DETECTING INTERFERENCE IN GLOBAL POSITIONING SATELLITE SIGNALS

BACKGROUND OF THE INVENTION

1. Field of the Invention

The present invention relates to detecting and compensating for interference in GPS signals. More specifically, the present invention relates to a system and method for detecting interference in GPS signals that produce GPS coordinates with unacceptable error.

2. Discussion of Background Information

The use of the GPS network to provide positional coordinates is well known. In summary, a GPS receiver receives different time-stamp signals from a network of satellites, and uses known techniques to derive the latitude and longitude coordinates of the GPS receiver. Signals from at least three satellites are necessary for a ground position, and four for an elevated position.

The accuracy of the resulting GPS coordinates is dependent in part on which satellite signals are used to derive the coordinates. Current GPS receivers are capable of selecting signals from a combination of satellites that provide the most accurate readings. For example, signals from satellites on the horizon are known to contribute to highly accurate coordinates, whereas signals from overhead satellites result in less reliable coordinates.

A weakness of the GPS system is that local interference may block one or more signals from the satellites. Since the satellites on the horizon have the weakest signal, local interference that blocks these signals may force the GPS receiver to use stronger signals from overhead satellites. This can reduce the accuracy of the coordinates derived by the GPS receiver by several hundred meters. Even DGPS, which is a more accurate version of GPS that accounts for various atmospheric conditions, can be adversely affected by local interference.

Recent advancements in miniaturization and manufacturing have led to commercial adoption of GPS devices in vehicles and boats for positional determination. Efforts are also underway to incorporate, and actively use, GPS devices in airplanes for navigation purposes, particularly in landing operations. However, the effect of local interference on the accuracy of GPS coordinates can introduce hazards into aircraft landing procedures, and has been a significant impediment to the adoption of GPS use in aircraft.

SUMMARY OF THE INVENTION

The present invention provides a system and method for detecting local interference in GPS signals.

According to an embodiment of the invention, there is provided a method for detecting errors in GPS accuracy. The method includes determining an initial GPS position of a marker, receiving GPS signals at the marker, calculating, from the GPS signals, a GPS coordinate position of the marker, comparing the GPS coordinate position and the initial GPS position, and issuing a warning if the GPS coordinate position differs from the initial GPS position by more than a predetermined amount.

According to another embodiment of the invention, there is provided a system for detecting local interference in GPS signals. A GPS receiver is capable of determining its GPS coordinates. A memory is capable of storing an initial location of the GPS receiver and a user-defined range of error. A processor is programmed to determine whether GPS coordinates from the GPS receiver differ from the initial location by more than a range of error, and for issuing a warning in response thereto.

Other exemplary embodiments and advantages of the present invention may be ascertained by reviewing the present disclosure and the accompanying drawings.

BRIEF DESCRIPTION OF THE DRAWINGS

The present invention is further described in the detailed description which follows, in reference to the noted plurality of drawings by way of non-limiting examples of certain embodiments of the present invention, in which like numerals represent like elements throughout the several views of the drawings, and wherein.

DETAILED DESCRIPTION OF THE EXEMPLARY EMBODIMENT

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

Figure 1:
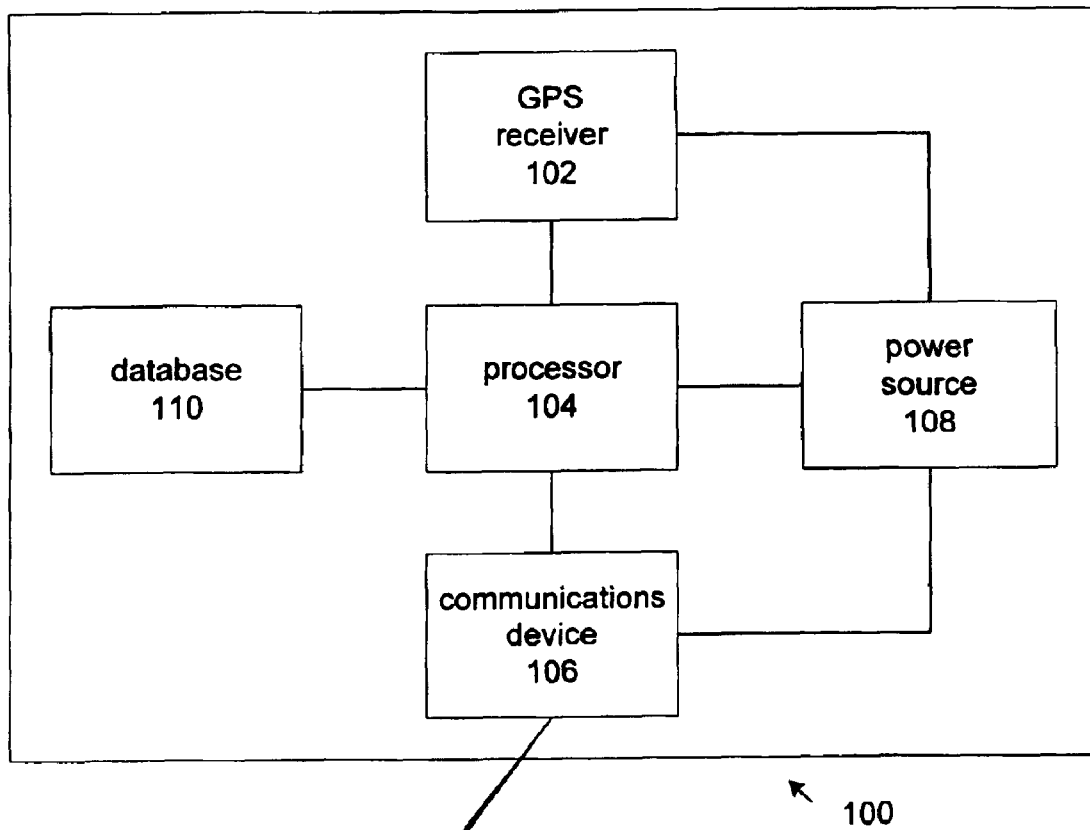
FIG. 1 shows a preferred embodiment of the present invention.
Figure 1:
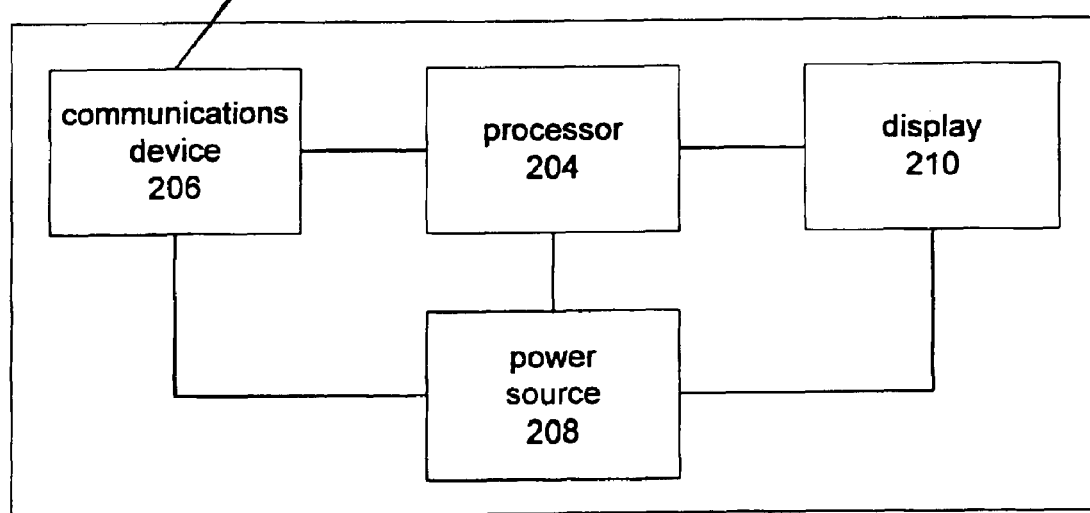

FIG. 1 shows an interference detector 100 that can communicate with a remotely located monitoring unit 200 according to a preferred embodiment of the invention. Interference detector 100 includes a GPS receiver 102, a processor 104, a communications device 106, a power source 108, and a memory 110. Monitoring unit 200 preferably includes a processor 204, a communications device 206, a power source 208, and a display 210. GPS receiver 102 is preferably a high-end survey grade receiver capable of using at least eight channels that allows data logging through a COM port, such as manufactured by MAGELLAN. Processor 104 is preferably a JORNADA processor for purposes of miniaturization, although processor 204 may be any commercially available processor. Communications devices 106 and 206 may be a radio transmitter or telephone lines (wireless or landline). Power sources 108 and 208 are preferably a battery or standard AC connection. Interference detector 100 communicates with a remotely located monitoring unit 200 through communications devices 106 and 206. Both units may have other equipment consistent with standard computer and GPS operations.

Once being placed at a location, interference detector 100 must be initialized to determine its position. If the exact GPS coordinates of the position are known (e.g., from a site survey), then a user can enter the data directly into processor 104 or memory 110, either remotely through communications device 106 or directly by an appropriate interface (not shown) on interference detector 100. If the position is not known, then processor 104 can take a single GPS reading of the data from GPS receiver 102 and store that single reading as the coordinates for the initial position.

In the alternative, processor 104 can subject GPS samples from a fixed or variable period to statistical analysis. By way of non-limiting example, an initial position can be determined by averaging GPS coordinates taken at one sample per second over an eight-hour period; individual samples that appear particularly abnormal can be disregarded as aberrant, and the period and sample rate may be set as desired. Another method would be to form a bell curve based on the GPS coordinates and to take the most significant data (e.g., 50 per cent centered on the median). The result of the statistical analysis is used as the initial position of the interference detector 100.

An appropriate range of error is also decided upon and stored in processor 104 or memory 110, either by preprogramming, user interface, or remotely. As discussed in more detail below, the range of error represents how far a later-derived GPS coordinate can be from the initial position without generating a warning. The range of error may be uniform and omnidirectional, or vary based on direction and/or altitude. The range of error may be set before or after calibration.

With the initial position and range of error set, interference detector 100 periodically determines its GPS coordinates, preferably once per second, although other fixed or variable periods may be used. GPS receiver 102 selects the best combination of available GPS signals from the satellite network and derives/calculates the resulting GPS coordinates of interference detector 100. Processor 104 then compares the GPS coordinates with the coordinates of the initial position. If the GPS coordinates differ from the coordinates of the initial position by more than the range of error, then interference detector 100 issues a warning to monitoring unit 200 through communications device 106. In the alternative, processor 104 may issue a warning based on a percentage of errors, e.g., three out of five consecutive samples, or ten samples within an hour, are outside the range of error.

The calculation of GPS coordinates outside the range of error indicates that local interference is blocking the clean receipt of GPS signals from a combination of satellites that would otherwise result in GPS coordinates with an acceptable range of accuracy. With the resulting warning of the presence of interference, known techniques can be used to locate the source of the interference and neutralize the same; this may require interrogation of memory 104 to identify which satellites are being interfered with, and/or triangulation of interference effects on multiple interference detectors 100. By way of non-limiting example, if the interference were being generated by a spark gap in a generator at an airport, the generator would be located and repaired to remove the spark gap.

Interference detector 100 can also issue a warning if GPS receiver 102 does not receive enough satellite signals to derive a GPS position, the average GPS signal strength is below a certain threshold, or if the interference detector 100 has been moved beyond a threshold amount. All of these thresholds are adjustable.

Monitoring unit 200 receives the warnings and can display information on the status of interference detector 100 on display 210. Typically, interference detector 100 would be displayed on the map in green if its GPS coordinates are within the range of error, red if outside the range of error, or yellow if one of the other types of warning is received. Of course, various other forms of alerting users of warning conditions are possible. By way of non-limiting example, a single LED on a panel or an audio alarm can be used to alert a user of the warning.

In the preferred embodiment, certain operations, functions, and associated structures are associated with either interference detector 100 and/or monitoring unit 200. However, the invention is not so limited, and various allocations of these operations, functions, and associated structures may be made between these two components within the scope and spirit of the present invention. By way of non-limiting example, interference detector 100 may comprise only a GPS receiver and communications device such that it only sends the raw time codes to monitoring unit 200; in such a case, monitoring unit 200 would include the necessary hardware and software to perform all of the functions described herein.

Monitoring unit 200 is preferably a fixed-base station that monitors several dispersed interference detectors 100 that collectively cover an area, such as an airport. However, the invention is not so limited, as monitoring unit 200 may be a portable hand-held device, and may work in conjunction with a single unit.

Various features can be added to enhance the security of interference detector 100. As noted above, interference detector 100 is capable of detecting if it has been moved from its initial position. Communications devices 106 and 206 may communicate through known encryption techniques. The outer casing of interference detector 100 may include tamper detection elements that result in yet another warning being issued if the casing is tampered with.

A test unit constructed consistent with the above under the name GAMES includes the following.

The GAMES system includes a base station and multiple remote sensors that monitor the GPS signals and report back if any changes occur. The remote sensors have user-configurable sensitivities to reduce false positives. Other configurable settings are the report rate and data-logging rate. When a GPS anomaly is detected or a GPS anomaly resolves itself, an out-of-schedule report is sent to the base station. The base station receives that report through email and stores the information in a database. When an anomaly is either detected or resolved, the ArcView display is updated to show the current state of the sensor.

There are four types of messages that can appear within a GPS message: New Valid Position; Anomaly Set; Anomaly Cleared; and Periodic Log Message. The New Valid Position message is sent when the remote unit is initialized or a "Make Valid" button is pressed on the remote unit. It contains the accurate position of the sensor unit. It is this position that may be used to calculate position deviations.

There are four types of Anomaly Set messages; position, timeout, signal, and sats. This message is sent when the remote unit has decided that an anomaly has occurred. The anomalous conditions are that the latest position has deviated a specific distance from the known location, that there has been no GPS signal received for a specified time, that the average signal strength has fallen below a specified level, and finally, that the number of detected satellites has fallen below a specified threshold. All of the thresholds are user-settable. The Anomaly Cleared message is sent when the anomalous condition has been resolved.

The Periodic Log message contains time-averaged GPS data that can be stored in a database on the base station. The data contained within these messages can be used to determine if the threshold values for error conditions should be changed.

The GAMES_MFC application on the base station periodically checks the incoming email for messages with a subject of "GPS MSG". When one of these messages is received, it reads the message, extracts the text, parses it to extract the remote station's information, updates the database tables with the new information, and, if necessary, updates ArcView. There is a single button on the interface for shutting down the application. If the database is nonexistent or ArcView is not running when the application is started, it may fail to start.

Access is the database engine used to store all of the data received from the remote units. The database is called gps.mdb and contains three tables, sensor_name_tbl, sensor_valid_tbl, and sensor_data_tbl. The sensor_name_tbl contains the association between the sensor_name and the sensor_id used in all of the other tables. When a new sensor is brought online, the name is stored in this table and a unique sensor_id is created. All of the data that is received from the remote units is stored in the sensor_data_tbl. Only the latest valid position information is stored in the sensor_valid_tbl. This table also contains the latest state of the sensors.

The Games project in ArcView contains required scripts for the processing of the messages that arrive from the GAMES_MFC application. The incoming messages are all routed through the game_main script that parses the parameter list and then executes the appropriate games script. The other requirement of ArcView is the 3-D Analyst extension. This should be loaded because the themes created are all 3-D shape files.

The remote station includes an HP JORNADA connected to a MAGELLAN PROMARK GPS receiver and a TELULAR Analog Cell Phone Modem. All of this is contained along with batteries and battery charger in a Pelican case for waterproofing. There are two watertight coaxial connectors on the outside of the case for the GPS antenna and for the cellular telephone antenna. These antennas are contained within the case and should be removed and attached when setting up the unit. The antennas are attached to fiberglass rods that can be placed in holes in the outside of the Pelican case. Once the JORNADA's software is initialized and the antennas connected, then the case can be closed.

Figure 2:
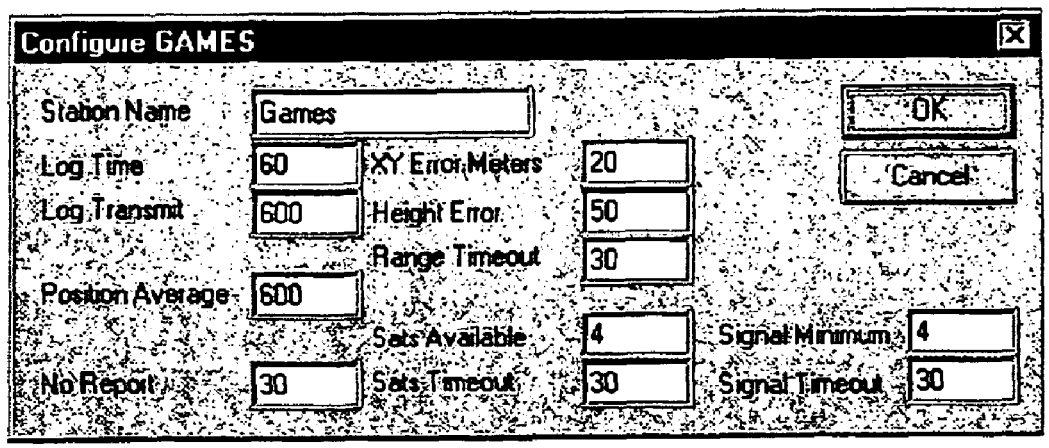
FIG. 2 shows the remote system configuration screen of an embodiment of the present invention.

The GAMES software on the JORNADA is started by double clicking on the GAMES icons on the desktop. The configure button should be pressed so that the following parameters can be set. FIG. 2 shows the remote system configuration screen. The parameters therein include:

| Parameter Name | Description | Units |
|---|---|---|
| Station Name | The unique name of the unit | text |
| Log Time | The period to wait between logging the position. | seconds |
| Log Transmit | The period to wait between sending the log information to the base station. | seconds |
| Position Average | The period to spend averaging the position before marking as the valid position. Used during the initialization period. | seconds |
| XY Error Meters | The horizontal distance away from the valid position that must be crossed to cause a range anomaly. | meters |
| Height Error | The vertical distance away from the valid position that must be crossed to cause a range anomaly. | meters |
| Range Timeout | The period the position must be outside the error distance before the position-moving anomaly is set. This time is also used for clearing the anomaly. Reduces the errors caused by a momentary | seconds |

-continued

| Parameter Name | Description | Units |
|---|---|---|
| | fluctuation in position. Also referred to as a hysteresis value. | |
| No Report | The period with no data from the GPS receiver before a timeout anomaly is sent. | seconds |
| Sats Available | The minimum number of satellites seen before a satellite count anomaly is set. | number |
| Sats Timeout | The hysteresis time before the satellite count anomaly is set or cleared. | seconds |
| Signal Minimum | The minimum RSSI allowed before the low signal anomaly is sent. | 0–9 |
| Signal Timeout | The hysteresis time before the low signal strength anomaly is set or cleared. | seconds |

Figure 3:
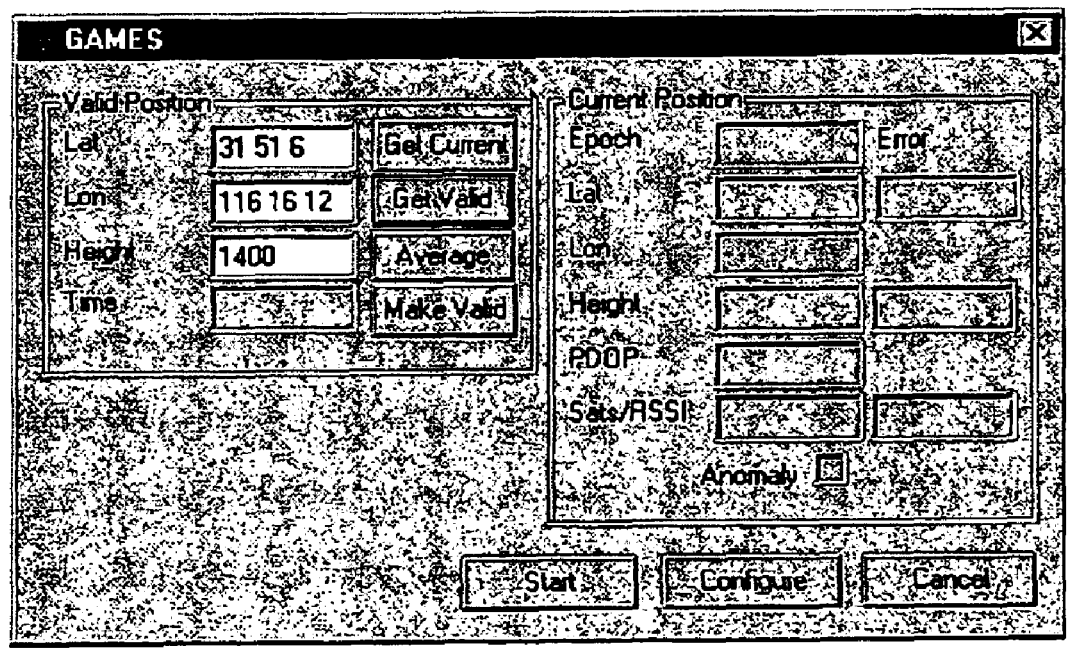
FIG. 3 shows the remote system main screen of an embodiment of the present invention.

FIG. 3 shows the remote system main screen. Once all of the configuration parameters are set then the OK button is pressed and the main screen is active again. Pressing the start button starts the software. An initial valid position is set by pressing the Average button, which averages the unit's position for the length of time specified on the configuration screen, or entering the unit's surveyed position and pressing make valid. The units on the Lat and Lon fields are decimal degrees and the Height field is meters. The current state of the unit is displayed on the right side of the main screen.

The base station software includes the GAMES_MFC application, ArcView, and Microsoft Access. There are no restrictions concerning the use of ArcView while the GAMES_MFC application is running in the background. The intention is that the operator should be analyzing the received data and monitoring the incoming data for changes.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

What is claimed is:

1. A method for detecting errors in GPS accuracy, comprising:
   determining an initial GPS position of a marker;
   receiving GPS signals at the marker;
   calculating, from the GPS signals, a GPS coordinate position of the marker;
   comparing the GPS coordinate position and the initial GPS position; and
   issuing a warning if the GPS coordinate position differs from the initial OPS position by more than a predetermined amount,
   identifying, in response to said issuing, a source of local interference; and
   neutralizing the source of local interference.

2. The method of claim 1, said determining further comprises obtaining coordinates from a site survey.

3. The method of claim 1, said determining further comprising:
   receiving GPS signals at the marker;
   obtaining a single sample of the GPS signals; and
   calculating a single GPS position from the single sample of the GPS signals; and
   setting said initial GPS position at the single GPS position.

4. The method of claim 1, further comprising issuing a warning if there are insufficient GPS signals to perform said calculating.

5. A method for detecting errors in GPS accuracy, comprising:
   determining an initial GPS position of a marker;
   receiving GPS signals at the marker;
   calculating, from the GPS signals, a GPS coordinate position of the marker;
   comparing the GPS coordinate position and the initial GPS position; and
   issuing a warning if the GPS coordinate position differs from the initial GPS position by more than a predetermined amount;
   said determining further comprising:
      calculating a plurality of GPS positions for the marker over a period of time;
      statistically analyzing the plurality of GPS positions; and
      setting said initial GPS position based on a result of said analyzing.

6. The method of claim 5, said analyzing comprising taking an average of at least some of the plurality of GPS positions.

7. The method of claim 5, said analyzing including disregarding aberrant ones of the plurality of GPS positions.

8. A method for detecting errors in GPS accuracy, comprising:
   determining an initial GPS position of a marker;
   receiving GPS signals at the marker;
   calculating, from the GPS signals, a GPS coordinate position of the marker;
   comparing the GPS coordinate position and the initial GPS position;
   issuing a warning if the GPS coordinate position differs from the initial GPS position by more than a predetermined amount;
   identifying, in response to said issuing, a source of local interference; and
   neutralizing the source of local interference.

9. A system for detecting local interference in GPS signals, comprising:
   a GPS receiver capable of determining its GPS coordinates;
   a memory capable of storing an initial location of said GPS receiver and a user-defined range of error;
   a processor being programmed to determine whether GPS coordinates from said GPS receiver differ from said initial location by more than a range of error, and for issuing a warning in response thereto;
   a plurality of remote units, each including said GPS receiver, said memory, said processor, and a transmitter capable of sending said warning; and
   a monitoring unit including a receiver capable of receiving said warning from each of said plurality of remote units, and a display capable of displaying information relating to said warning;
   wherein said plurality of remote units collectively provide local interference detection over an area.

10. A method for detecting errors in GPS accuracy, comprising:
    determining an initial GPS position of a marker;
    receiving GPS signals at the marker;
    calculating, from the GPS signals, a GPS coordinate position of the marker;
    comparing the GPS coordinate position and the initial GPS position; and
    issuing a warning if the GPS coordinate position differs from the initial GPS position by more than a predetermined amount;
    wherein the marker is in the same location for said determining and said calculating,
    said determining further comprising:
       calculating a plurality of GPS positions for the marker over a period of time;
       statistically analyzing the plurality of GPS positions; and
       setting said initial GPS position based on a result of said analyzing.

11. The method of claim 10, said analyzing comprising taking an average of at least some of the plurality of GPS positions.

12. The method of claim 10, said analyzing including disregarding aberrant ones of the plurality of GPS positions.

13. The method of claim 10, further comprising issuing a warning if there are insufficient GPS signals to perform said calculating.

14. A system for detecting local interference in GPS signals, comprising:
    a stationary GPS receiver capable of determining its GPS coordinates;
    a memory capable of storing an initial location of said GPS receiver and a user-defined range of error; and
    a processor being programmed to determine whether said GPS coordinates from said GPS receiver differ from said initial location by more than a said user-defined range of error, and for issuing a warning in response thereto;
    a plurality of remote units, each including said GPS receiver, said memory, said processor, and a transmitter capable of sending said warning; and
    a monitoring unit including a receiver capable of receiving said warning from each of said plurality of remote units, and a display capable of displaying information relating to said warning;
    wherein said plurality of remote units collectively provide local interference detection over an area.

15. A method for detecting errors in GPS accuracy, comprising:
    determining an initial GPS position of a marker;
    receiving GPS signals at the marker;
    calculating, from the GPS signals, a GPS coordinate position of the marker;
    comparing the GPS coordinate position and the initial GPS position;
    issuing a warning if the GPS coordinate position differs from the initial GPS position by more than a predetermined amount; and
    identifying, in response to at least said issuing, a source of local interference.

16. A method for detecting errors in GPS accuracy, comprising:
   determining an initial GPS position of a marker;
   receiving GPS signals at the marker;
   calculating, from the GPS signals, a GPS coordinate position of the marker;
   comparing the GPS coordinate position and the initial GPS position;
   issuing a warning if the GPS coordinate position differs from the initial GPS position by more than a predetermined amount; and
   neutralizing at least one source of local interference that is at least partially responsible for the GPS coordinate position differing from the initial GPS position by more than the predetermined amount.

* * * * *